Feb. 23, 1932.  L. F. TURNBULL  1,846,232
MACHINE FOR HANDLING FABRIC ARTICLES
Filed Oct. 17, 1927   3 Sheets-Sheet 3

Inventor:
LEROY F. TURNBULL,
By John N Bruninga
His Attorney.

Patented Feb. 23, 1932

1,846,232

UNITED STATES PATENT OFFICE

LEROY FREDERICK TURNBULL, OF ST. LOUIS, MISSOURI

MACHINE FOR HANDLING FABRIC ARTICLES

Application filed October 17, 1927. Serial No. 226,750.

This invention pertains to a machine for handling articles of fabric, such as towels and similar linens, and more particularly for counting such articles.

One of the objects of this invention is to provide a machine which will pick up or select such fabric articles from a stack in which they have been piled promiscuously, and which will separate the articles so that they may be counted one at a time.

Another object is to provide such a machine with means for insuring that not more than one article will be selected at a time.

Another object is to provide such a machine with improved means for counting the articles as they pass through the machine.

Further objects will appear from the following description, taken in connection with the accompanying drawings, in which—

Figure 5 is a sectional detail, somewhat enlarged, showing the construction of the selecting or picking up devices;

Figure 6 is an enlarged sectional detail of the counting mechanism on the line 6—6 of Figure 3; and Figure 7 is an enlarged perspective detail of the feeder.

Figure 2:
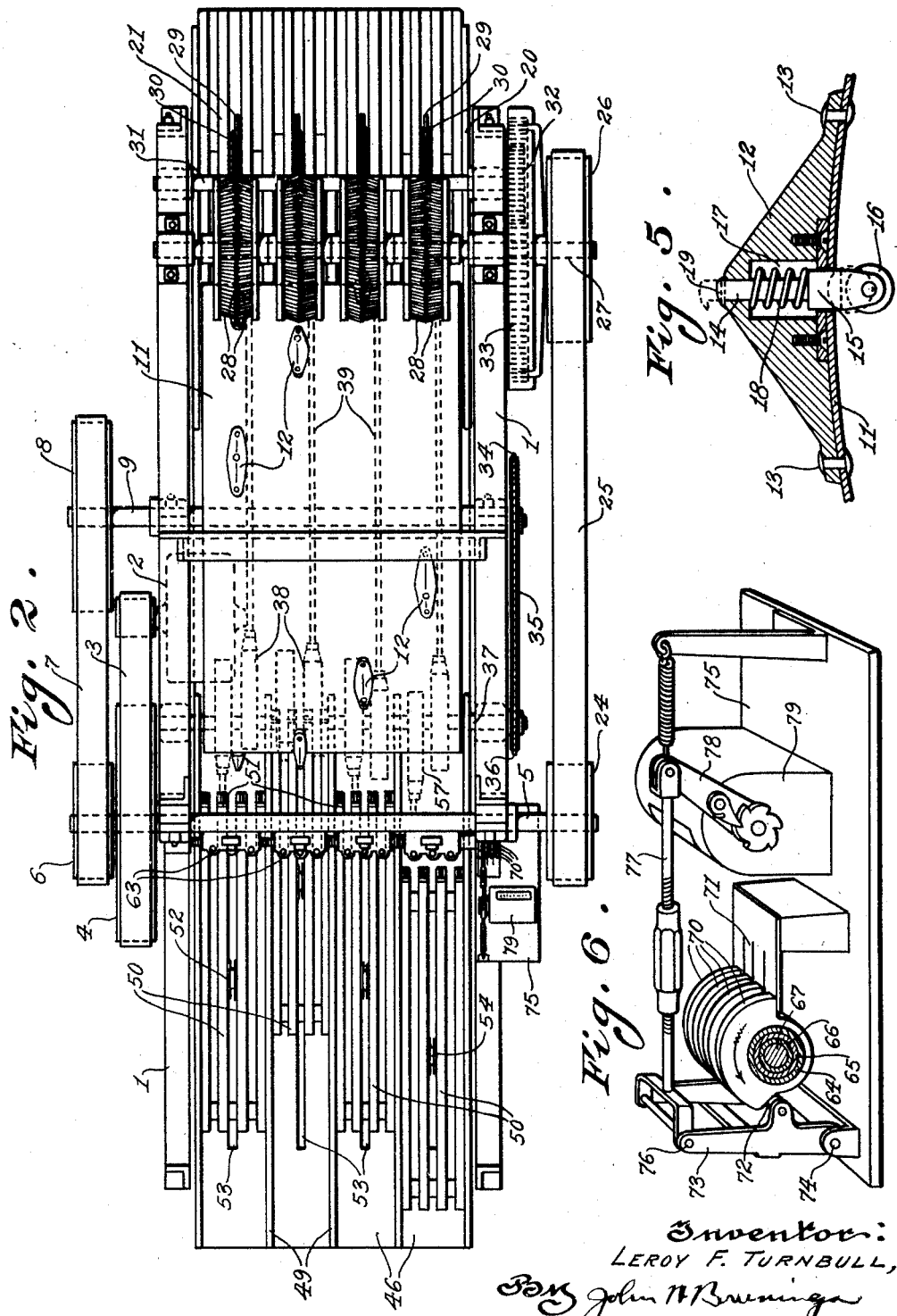
Figure 2 is a plan view of the same.

Referring now to the drawings, 1 designates a supporting frame, which may be constructed of angle iron or other suitable material. A motor 2 is mounted in the lower portion of the frame 1 for driving the machine. The motor 2 is connected by a belt 3 with a pulley 4 mounted on a countershaft 5 supported in a suitable bearing on the upper part of the frame 1. The countershaft 5 carries a pulley 6 connected by means of a belt 7 with a pulley 8 on the main drum shaft 9. Fixed to the shaft 9 is a spider 10 carrying a carrier or drum 11. The drum 11 is cylindrical in form and has mounted at intervals upon its periphery a series of picking up or grasping devices, indicated generally at 12. The devices 12 are arranged at regular intervals around the periphery and in adjacent rows spaced axially from one another, the devices in different rows being staggered, as shown in Figure 2.

The picking up devices 12 are shown in detail in Figure 5. The body of the device 12 is generally conical in shape, but narrower transversely and somewhat extended peripherally. The body is secured to the drum 11 by means of rivets 13 or other suitable fastenings. The central portion of the body is bored radially to receive a plunger 14 carrying at its inner end a clevis 15 carrying a cam roller 16. The central bore is enlarged, as indicated at 17, to receive a spring 18, which surrounds the shank 14 and bears at one end against the clevis 15 and at the other against the base of the bore 17. The upper end of the shank 14 is traversed by a pin 19, which prevents the spring 18 from drawing the shank out of the bore. The pin 19 is sharpened at its forward end and protrudes from the shank 14 a sufficient distance to pierce an article with which it may come into engagement during its revolution with the drum so as to pick up and hold the article. As will be presently described, a cam engaging the roller 16 operates to project the shank 14 from the body 12 at the proper time of its revolution, so that the sharpened pin 19 will come into engagement with a fabric article so as to pierce and pick up the same, after which the spring 18 is permitted to retract the shank so that the pin 19 will be drawn inwardly to bind the article securely against the body 12 so as to hold the same securely. The device 12, therefore, provides means adapted to pick up an article from a promiscuous stack and to grasp the same securely during its subsequent travel.

A hopper 20 is mounted on the frame 1 to receive the articles to be handled by the machine. These articles may be dumped into the hopper in a promiscuous stack. The bottom of the hopper 20 is formed of slats 21 (see Figure 7), and the drum 11 passes partly through the hopper, the devices 12 passing between the slats.

A cam 22 mounted on a bracket 23 on the frame 1 is positioned within the drum 11 so as to engage the rollers 16 on the grasping devices so as to extend the shank 14 to active position just before the device passes into the hopper 20. In this position, the device provides a sharpened hook, which upon passing through the hopper, will pick up an article. The cam 22 terminates before the picking up device has passed out of the hopper, so that the pin will be retracted to grasp the article before it leaves the hopper.

As it may happen that one article in the hopper may cling to another and be carried upwardly with an article picked up by the grasping device, means are provided for removing such superfluous articles from the device. A pulley 24 on the counter-shaft 5 is connected by a belt 25 with a pulley 26 on a second counter-shaft 27 suitably journaled on the frame 1. The counter-shaft 27 carries a series of pairs of brushes 28. The brushes 28 are circular in form, having their bristles extending axially. The bristles of each pair of brushes extend toward each other. The brushes are so spaced on the counter-shaft 27 that the pick-up devices 12 will pass between the two brushes of a pair.

When an article has been picked up by one of the devices 12, it is carried upwardly between the revolving brushes 28, and any superfluous articles adhering thereto are brushed off so as to drop back into the hopper 20.

Figure 1:
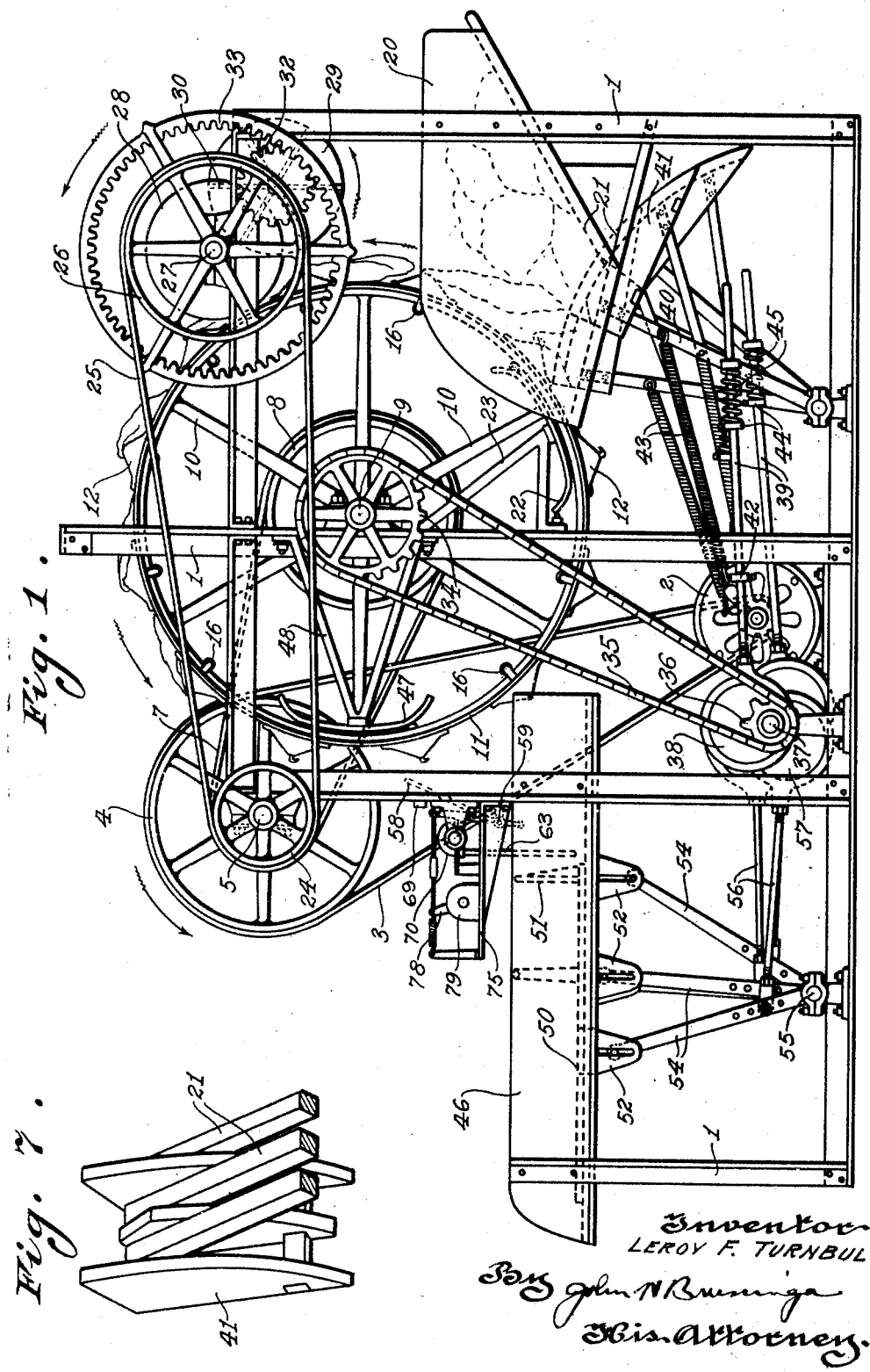
Figure 1 is a side view of a machine embodying this invention.

In order to prevent an article becoming lodged between a pair of brushes 28, each pair of brushes is provided with a cleaner 29. Such cleaner consists of a disc provided on each face thereof with a series of radiating ribs 30 (see Figure 1). The several cleaners are mounted at proper intervals upon a shaft 31, which carries a pinion 32 driven by an internal gear 33 mounted on the counter-shaft 27. The drum, the brushes and the cleaners rotate in the directions indicated by arrows in Figure 1. It will be seen that the cleaners 29 will operate to sweep any superfluous articles out from between the brushes 28 so that they will drop back into the hopper 20.

The drum shaft 9 carries a sprocket 34 connected by a chain 35 to drive a sprocket 36 on a shaft 37 suitably journaled on the frame 1. The shaft 37 carries a series of eccentrics 38, each connected to reciprocate a rod 39. The rod 39 is resiliently connected to an arm 40 pivoted on the frame and having a feeder 41 for feeding the articles in the hopper to each row of holders 12. A collar 42 on the rod 39 is connected by means of a spring 43 with the arm 40. A second collar 44 on the rod 39 has a coil spring 45 interposed between it and a perforated lug on the arm 40. It will be seen that, by means of these connections, the feeder 41 is resiliently driven with a reciprocating movement. The feeder 41 is constructed of a series of upright vanes (see Figure 7) adapted to pass between the slats 21 of the bottom of the hopper. As the feeder swings back and forth, the articles in the hopper will be continually moved forward to a position to be engaged by the devices 12.

On the forward part of the frame 1 is mounted a bin or receptacle 46, forming a conveyor receiving the articles from the carrier 11. This bin is positioned under the downwardly moving side of the drum or carrier 11 so as to receive the articles delivered thereby. A second cam 47, similar to the cam 22, is mounted on a bracket 48 on the frame 1 and so positioned as to cause the roller 16 to extend the shank 14 and release the article held by the hook 19 at a proper time to permit the released article to drop into the bin 46.

The bin 46 is divided into a series of compartments by partitions 49. In each compartment, a conveying device 50 is adapted to slide forward and back. Each conveying device is constructed of a series of slats adapted to slide along the bottom of its compartment, each slat being equipped at its rearward end with an upright finger 51. Each discharging device 50 is provided with a bracket 52 extending through a slot 53 in the bottom of the bin 46 and having a pin and slot connection with a lever 54 pivoted at 55 on the frame 1 and connected by a rod 56 to one of a series of eccentrics 57 fixed on the shaft 37. These connections provide for reciprocating the conveying devices 50 in timed relation with the movement of the drum.

Figure 4:
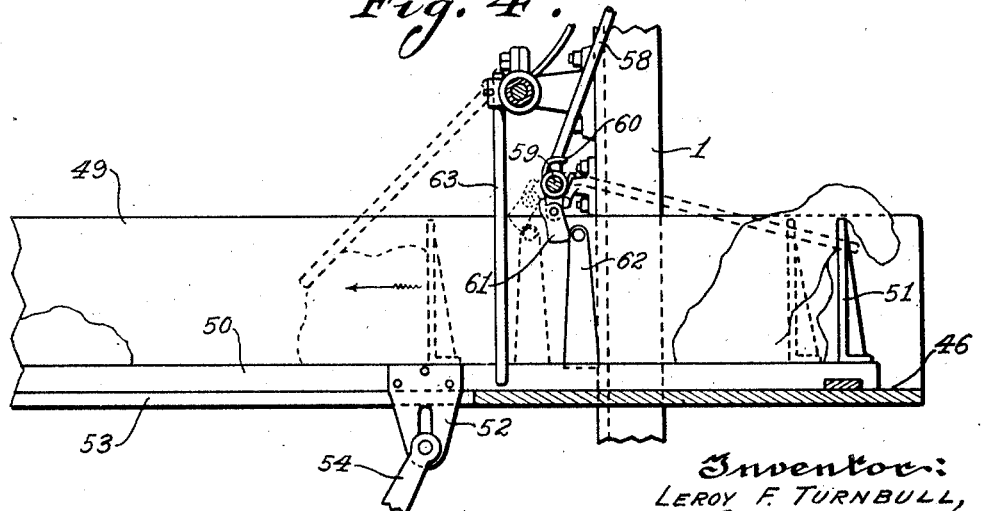
Figure 4 is a sectional detail of Figure 3.

The timing of the movement of the device 50 is such that the finger 51 is in its rearmost position (as shown in Figure 4) when the article is released by the device 12. In this position the article will drop upon the conveying device in front of the fingers 51. As it may happen that a large article may overhang the fingers, as indicated in Figure 4, means are provided for compacting the article in the conveying device.

For this purpose each conveying device is provided with a group of fingers 58 pivoted on a rod 59 extending transversely of the frame 1 and maintained in upright position by a spring 60. The lower end of the finger 58 has pivoted thereto a dog 61, spring-retained in extended position in any well known manner, and adapted to engage an arm 62 upstanding at the side of the conveyor 50. When the conveyor moves forward, the arm 62 engages the dog 61 so as to swing the finger 58 downwardly to position indicated in dotted lines in Figure 4, the fingers 58 passing between the fingers 51. During this movement, the fingers 58 engage the article and press the same down to compact it in front of the fingers 51. The conveyor 50 now moves forward, carrying the article with it.

Figure 3:
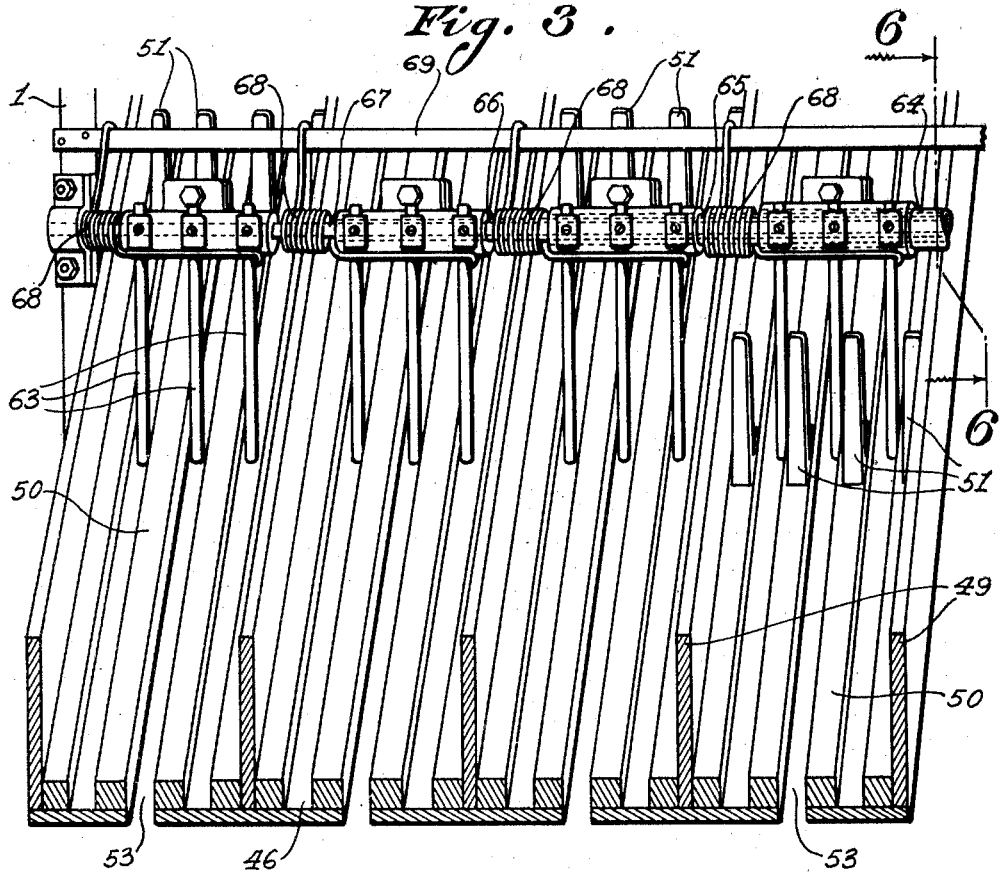
Figure 3 is an enlarged perspective detail of the discharging mechanism, showing the connections for counting the articles.

The articles are counted as they are moved forward by the conveyor 50. A group of fingers 63 is pivoted so as to extend downwardly into each compartment of the bin 46 and so positioned as to pass between the fingers 51 when the conveyor is empty. Each group of fingers 63 is mounted upon a separate shaft 64, 65, 66 and 67 (see Figure 3). The first three of these shafts are hollow, and all four are arranged concentrically, as shown in Figures 3 and 6. Each group of fingers 63 is yieldingly retained in a vertically suspended position by means of a coil spring 68 surrounding its shaft and having its other end engaging a bar 69 mounted transversely of the frame 1.

The shafts 64, 65, 66 and 67 extend transversely of the frame 1, being journaled thereon, and each shaft has fixed thereto one of the cams 70. Each of these cams has a shoulder engaging a stop plate 71, which fixes the vertical position of the fingers 63. The other side of the cam has a portion adapted to engage a roller 72 on the arm 73 pivoted at 74 on a table 75 mounted on the frame 1. The upper end of the arm 73 has pivoted thereto at 76 an adjustable link 77 connected to the operating arm 78 of a counter 79 of any suitable design.

It will be seen that, as the conveyor 50 moves forwardly, as indicated by the arrow in Figure 4, if the conveyor is empty, there will be no effect upon the fingers 63. If the conveyor contains an article, the same will close the gaps between the fingers 51 and will engage the fingers 63 as the conveyor moves forward. This operates to lift the fingers 63, thereby rotating the appropriate shaft 64, 65, 66 or 67. Rotation of such shaft will rotate the corresponding cam 70 in the direction indicated by the arrow in Figure 6. This movement of the cam will rock the arm 73 to the left (Figure 6), thereby operating the counter 79 one space. As the conveyors 50 operate in staggered relation, only one cam 70 will be operated at a time, and each individual article will be counted. As the article passes beyond the ends of the fingers 63, the latter will be released thereby so as to return to their vertical position. During this movement also, the arm 62 will move past the end of the dog 61 so as to permit the fingers 58 to return to their normal position. Upon rearward movement of the conveyor 50, the arm 62 will snap past the dog 61, while the article which is now positioned in front of the fingers 63 will be held thereby as the conveyor retires, so as to be moved along to a forward position on the conveyor, thereby clearing the rearward end of the same for the reception of another article. Successive operations will in this way move the articles to the end of the conveyor, where they will be eventually fed out of the end of the bin 46 to be received in any suitable receptacle, not shown.

The general operation of the machine is, therefore, as follows: The articles to be handled are dumped promiscuously into the hopper 20. As the drum rotates through the hopper, each pick-up device 12 passes the cam 22, and its hook is extended to engaging position. Each hook will pierce an article so as to pick up the same, and as the end of the cam 22 is passed, the article will be securely grasped and held. Rotation of the drum or carrier now carries the article up between a pair of brushes 28, which act as wipers to remove any superfluous article which may be carried with the drum. The cleaners 29 prevent the lodgment of any such articles between the brushes. The selected articles are then carried over the top of the drum to a position over the bin 46, whereupon the cam 47 operates to open the grasping device and release the article, which is dropped into the bin 46 upon a conveyor 50, and in front of the fingers 51. The forward movement of the conveyor now causes the fingers 58 to compact the article, after which it is carried forward into engagement with the fingers 63, which operate to count the article on the register 79. After this, the article is moved forward on the conveyor 50 until finally discharged thereby.

It will be seen that this invention provides a simple and effective machine, by means of which such fabric articles as towels, napkins, linen coats, etc., may be handled and counted in a laundry establishment. The machine selects the articles individually from a promiscuous stack, and superfluous articles are removed so that there is no chance of carrying two or more articles through the machine to be counted as one. The articles are securely held in their travel with the carrier or drum until the discharging point is reached, whereupon they are released individually to the counting mechanism. The feeder 41 keeps the articles in the bottom of the hopper fed forwardly toward the drum, so that all the articles to the last one will be picked up and counted.

While the invention is particularly applicable to the counting of such fabric articles, it may also be applied to other handling operations, where it is desired to handle the articles one by one. It will be understood, furthermore, that certain features and sub-combinations are of utility and may be employed without reference to other features and sub-combinations, and that such use is contemplated by and is within the scope of the appended claims. It is further obvious that various changes may be made, within the scope of the appended claims, in the details of construction without departing from the spirit of this invention. It is, therefore, to be understood that this invention is not limited to the specific details shown and described.

Having thus described the invention, what is claimed is:

1. A machine for handling fabric articles, comprising a movable carrier, means on said carrier adapted for opening to engage a fabric article and for closing to grasp the engaged article, means adapted to open and close said grasping means, and means for removing superfluous articles from said grasping means.

2. A machine for handling fabric articles, comprising means for handling fabric articles one at a time, discharging means having a plurality of fingers adapted to engage and move an article, and an arm positioned between said fingers adapted to engage and count the article.

3. A machine for handling fabric articles, comprising a hopper, a movable drum, a series of hooks on said drum adapted to pick up each a fabric article from said hopper, a brush adapted to remove superfluous articles from said hooks, and counting means having a shiftable element in the path of the articles picked up.

4. A machine for handling fabric articles, comprising a hopper, a movable drum, a series of hooks on said drum adapted to pick up each a fabric article from said hopper, a brush adapted to remove superfluous articles from said hooks, a conveyor rack adapted to receive the articles from said hooks, and means for counting the articles in said rack.

5. A machine for handling fabric articles, comprising means for presenting a pile of fabric articles, and mechanism cooperating with said presenting means and operating to withdraw the articles successively from the pile, said mechanism including means constructed to locate and attach the articles in the pile individually in order to secure their separate withdrawal.

6. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, and means for detaching from the withdrawn articles any which may be withdrawn therewith.

7. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, and means for engaging the articles on the pile with said attaching means.

8. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, and means for conveying the withdrawn articles.

9. A machine for handling fabric articles, comprising, means for presenting a pile of fabric articles, mechanism cooperating with said presenting means and operating to withdraw the articles successively from the pile and to dispose them in series relation, said mechanism including means constructed to locate and attach the articles in the pile individually in order to secure their separate withdrawal, and means for conveying the withdrawn articles while maintaining their series relation.

10. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, and an actuated element in the path of and engaged by the withdrawn articles.

11. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, and means cooperating with said attaching means for causing the same to release the articles.

12. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, a receiver for the withdrawn articles, and means cooperating with said attaching means for causing the same to release the articles to said receiver.

13. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, a conveyor for the withdrawn articles, and means cooperating with said attaching means for causing the same to release the articles to said conveyor.

14. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, a conveyor for the withdrawn articles, means cooperating with said attaching means for causing the same to release the articles to said conveyor, and means for compacting the articles on said conveyor.

15. A machine for handling fabric articles, comprising, means for presenting a pile of fabric articles, mechanism cooperating with said presenting means and operating to withdraw the articles successively from the pile, said mechanism including means constructed to locate and attach the articles in the pile individually in order to secure their separate withdrawal, a conveyor for the withdrawn articles, means cooperating with said attaching means for causing the same to release the articles to said conveyor, means for compacting the articles on said conveyor, and an actuated element in the path of the conveyed articles.

16. A machine for handling fabric articles, comprising, means for presenting a pile of fabric articles. and mechanism cooperating with said presenting means and operating to withdraw the articles successively from the pile, said mechanism including an element constructed to pierce a single article in the pile in order to secure its separate withdrawal.

17. A machine for handling fabric articles, comprising, means for presenting a pile of fabric articles, mechanism cooperating with said presenting means and operating to withdraw the articles successively from the pile, said mechanism including an element constructed to clamp a single article in the pile in order to secure its separate withdrawal.

18. A machine for handling fabric articles, comprising, means for presenting a pile of fabric articles, and mechanism cooperating with said presenting means and operating to withdraw the articles successively from the pile, said mechanism including an element having a short hook constructed to pierce a single article in the pile in order to secure its separate withdrawal.

19. A machine for handling fabric articles, comprising, means for presenting a pile of fabric articles, and mechanism cooperating with said presenting means and operating to withdraw the articles successively from the pile, said mechanism including a base and an element having a short hook movable to and from the base to attach a single article in the pile in order to secure its separate withdrawal.

20. A machine for handling fabric articles, comprising, means for presenting a pile of fabric articles, and mechanism cooperating with said presenting means and operating to withdraw the articles successively from the pile, said mechanism including a raised base movable into the pile and having an element constructed to attach a single article in the pile in order to secure its separate withdrawal.

In testimony whereof I affix my signature this 14th day of September, 1927.

LEROY FREDERICK TURNBULL.